United States Patent [19]
Li et al.

[11] Patent Number: 5,770,948
[45] Date of Patent: *Jun. 23, 1998

[54] ROTARY SIGNAL COUPLING FOR CHEMICAL MECHANICAL POLISHING ENDPOINT DETECTION WITH A STRASBAUGH TOOL

[75] Inventors: Leping Li, Poughkeepsie; Steven George Barbee, Dover Plains; Arnold Halperin, Cortlandt Manor, all of N.Y.; Richard Mars Ruggiero, Danbury, Conn.; William Joseph Surovie, Carmel, N.Y.

[73] Assignee: International Business Machines Corporation, Armonk, N.Y.

[*] Notice: The term of this patent shall not extend beyond the expiration date of Pat. No. 5,559,428.

[21] Appl. No.: 620,723

[22] Filed: Mar. 19, 1996

[51] Int. Cl.[6] .......................... H01L 21/302; G01B 7/06
[52] U.S. Cl. .................. 324/226; 324/234; 324/71.5; 156/626.1; 156/627.1
[58] Field of Search .................................. 324/226, 228, 324/229, 230, 234, 236, 262, 71.5; 156/626.1, 627.1, 345

[56] References Cited

U.S. PATENT DOCUMENTS 5,559,428  9/1996  Li et al. ................................ 324/71.5

*Primary Examiner*—Walter E. Snow
*Attorney, Agent, or Firm*—Alison D. Mortinger

[57] ABSTRACT

An apparatus for rotary signal coupling in in-situ monitoring of a chemical-mechanical polishing process by a polisher is provided with a sensor fixed to a rotatable wafer carrier for creating a signal responsive to the chemical mechanical polishing process, a conductor coupled to the sensor for receiving the signal, the conductor fixed to the rotatable wafer carrier, a contact coupled to the conductor, the contact fixed to a stationary drive arm, and signal transfer means coupled to the contact for transferring the signal to a monitoring means.

14 Claims, 4 Drawing Sheets

U.S. Patent      Jun. 23, 1998      Sheet 1 of 4      5,770,948
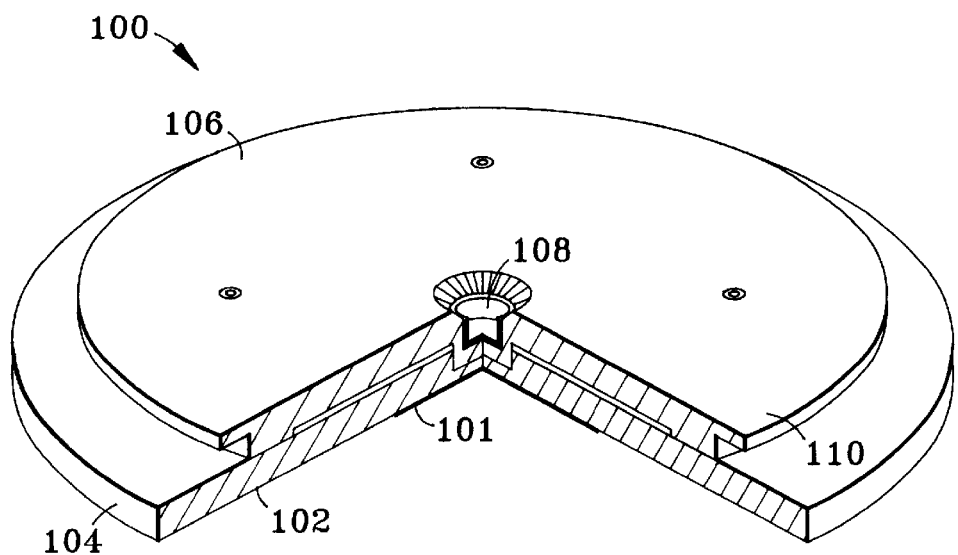
FIG. 1
(PRIOR ART)
FIG. 2
(PRIOR ART)
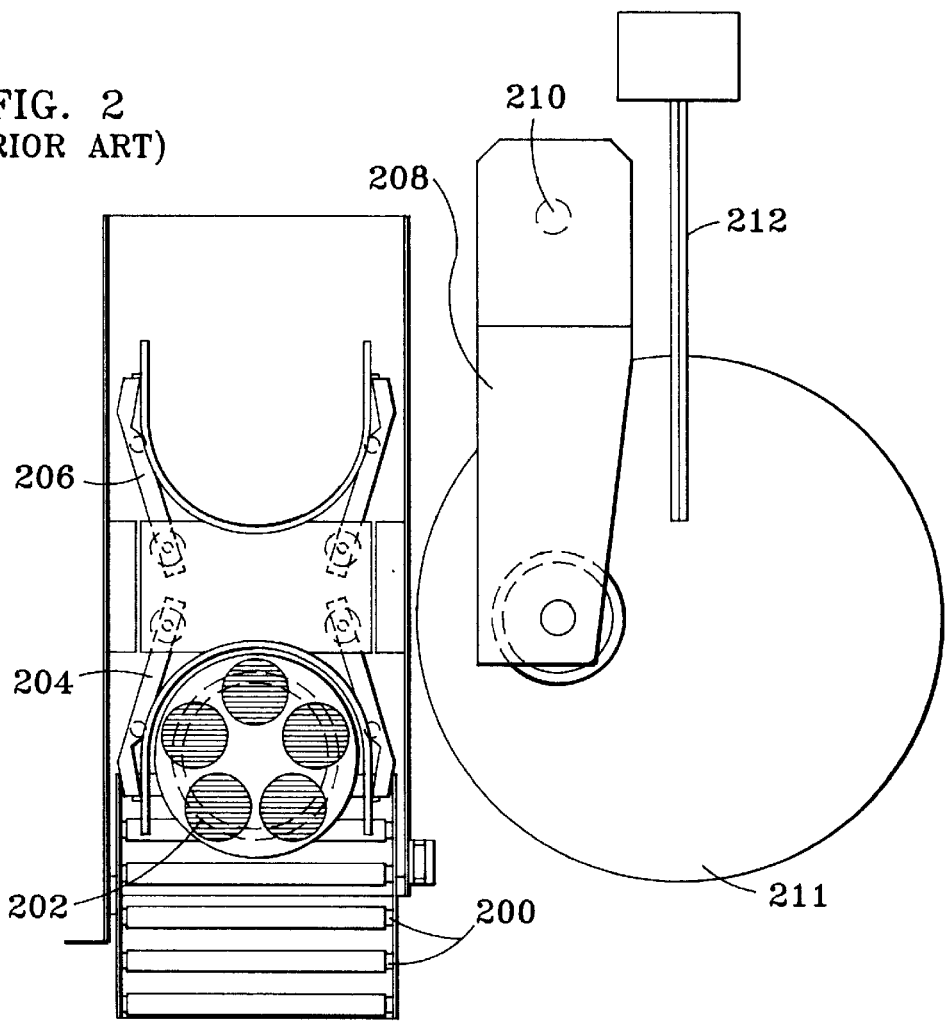

ROTARY SIGNAL COUPLING FOR CHEMICAL MECHANICAL POLISHING ENDPOINT DETECTION WITH A STRASBAUGH TOOL

FIELD OF THE INVENTION

This invention is directed to in-situ endpoint detection for chemical mechanical polishing of semiconductor wafers, and more particularly to the signal transfer from a rotating wafer carrier to a stationary portion of a polishing apparatus.

BACKGROUND OF THE INVENTION

In the semiconductor industry, chemical mechanical polishing (CMP) is used to selectively remove portions of a film from a semiconductor wafer by rotating the wafer against a polishing pad (or rotating the pad against the wafer, or both) with a controlled amount of pressure in the presence of a chemically reactive slurry. Overpolishing (removing too much) or underpolishing (removing too little) of a film results in scrapping or rework of the wafer, which can be very expensive. Various methods have been employed to detect when the desired endpoint for removal has been reached, and the polishing should be stopped. One such method described in copending patent application Ser. No. 08/419,206 filed Apr. 10, 1995, now U.S. Pat. No. 5,559,498 entitled "In-Situ Monitoring of the Change in Thickness of Films" and assigned to the present assignee, uses a sensor which can be located near the back of the wafer during the polishing process. As the polishing process proceeds, the sensor generates a signal corresponding to the film thickness, and indicates when polishing should be stopped.

R. Howard Strasbaugh, Inc. of San Luis Obispo, Calif. manufactures a chemical mechanical polishing apparatus (polisher) that is commonly used in the semiconductor industry. A Strasbaugh wafer carrier 100 that holds the wafers and rotates them (upside down) against a polishing pad is shown in FIG. 1, partially cut away. The wafer carrier includes a wafer template 101 having wafer recesses 102 (typically 5 of them) mounted on a frontplate 104, which in turn is mounted on a backplate 106. Backplate 106 has a drive arm recess 108 in which a polisher drive arm (better illustrated in FIG. 4) creates a vacuum for secure attachment during polishing. Because the wafers are loaded into carrier 100 while wafer recesses 102 are facing upwards, backplate 106 has a rim 110 under which gripper arms 204 (see FIG. 2) hold carrier 100 and flip it to the orientation shown for polishing.

FIG. 2 shows the prior art wafer carrier loading and polishing apparatus. Carrier 100 with wafer template recesses 102 facing upwards is moved over rollers 200 to where the first set of gripper arms 204 can grip carrier 100. Wafers 202 are then loaded into wafer template recesses 102. Carrier 100 is then flipped over by gripper arms 204 so that wafers 202 are facing downwards near a second set of gripper arms 206 (gripper arms 204 are still holding carrier 100). Drive arm (also known as robot arm) 208 then rotates about axis 210 and picks up carrier 100 by aligning with recess 108 (shown in FIG. 1) and creating a vacuum against the back (facing up now) of carrier 100. After gripper arms 204 release carrier 100, drive arm 208 then rotates back over polishing pad 211. Both carrier 100 and pad 211 rotate (in the same direction) and slurry is delivered to pad 211 by slurry tube 212. Polishing commences when drive arm 208 lowers carrier 100 onto pad 211, and when polishing is finished, wafer carrier 100 is returned to gripper arms 204 and flipped back over to the initial loading position. Note that typically two drive arms, wafer carriers, and loading areas share one pad and slurry tube, but for clarity only one set is shown.

When using the sensor of copending application Ser. No. 08/419,206 with the Strasbaugh polisher to determine the endpoint for polishing, positioning it near the back of the wafers necessitates locating it somewhere in the wafer carrier. This creates several problems. First, the wafer carrier is physically separated from the drive arm before and after the polishing process, so a separable and rotary means of electrical signal coupling to the carrier is necessary for in-situ real time endpoint monitoring. Second, the signal coupling must be mechanically robust to minimize wear. Third, the signal must be shielded from the effects of noise created by the rotating carrier. Fourth, exposure (both for contacts and the sensor) to the chemically corrosive slurry must be minimized. Finally, any modifications made to the carrier should be easily retrofitted to an existing Strasbaugh polisher to minimize changes to other parts of the system such as the drive arm and loading apparatus.

Thus there remains a need for rotary signal coupling for use in chemical mechanical polishing endpoint detection that solves the above-listed problems and is suitable for use in a Strasbaugh polisher.

SUMMARY OF THE INVENTION

It is therefore an object of the present invention to provide a means of signal coupling to get the signal from the sensor out to an endpoint monitoring apparatus.

It is a further object to provide a signal coupling which is mechanically robust to minimize wear.

It is another object to shield the signal from the effects of noise created by the rotating carrier.

It is yet another object to minimize exposure (both for contacts and the sensor) to the chemically corrosive slurry.

It is yet a further object that any modifications made to the carrier should be easily retrofitted to an existing Strasbaugh polisher to minimize changes to other parts of the system.

In accordance with the above listed and other objects, an apparatus for rotary signal coupling in in-situ monitoring of a chemical-mechanical polishing process by a polisher is provided with a sensor fixed to a rotatable wafer carrier for creating a signal responsive to the chemical mechanical polishing process, a conductor coupled to the sensor for receiving the signal, the conductor fixed to the rotatable wafer carrier, a contact coupled to the conductor, the contact fixed to a stationary drive arm, and signal transfer means coupled to the contact for transferring the signal to a monitoring means.

BRIEF DESCRIPTION OF THE DRAWINGS

These and other features, aspects, and advantages will be more readily apparent and better understood from the following detailed description of the invention, in which:

FIG. 1 shows the prior art Strasbaugh wafer carrier;

FIG. 2 shows the prior art wafer carrier loading and polishing apparatus;

DESCRIPTION OF THE PREFERRED EMBODIMENTS

Figure 3A:
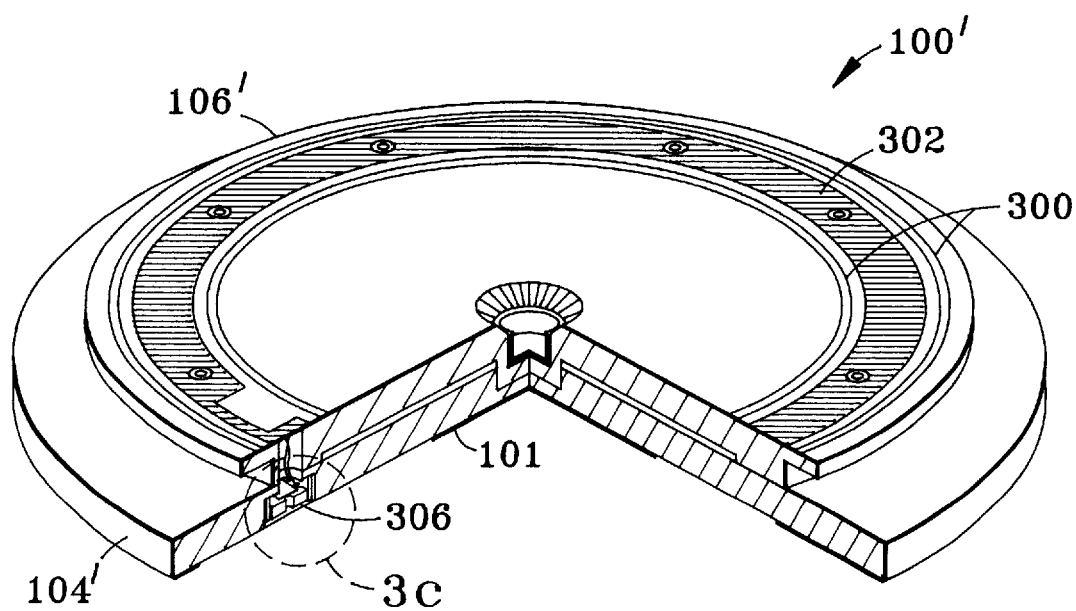
FIGS. 3a, 3b, and 3c show the modified wafer carrier.

Referring now to the drawings and more particularly to FIG. 3a, a modified wafer carrier 100' is shown. An insulating plate 302 with two concentric circular conductive strips 300 have been embedded in the face of backplate 106' where drive arm 208 engages carrier 100' (hereafter called the back side). Conductive strips 300 are made of a material which is chemically inert with respect to the slurry, and is resistant to wear from the contacts shown in FIG. 4. Oxidation resistant materials such as chrome or stainless steel are suitable.

Figure 3B:
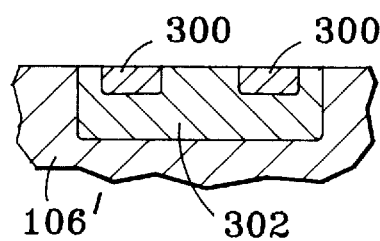

As better shown in FIG. 3b, conductive strips 300 are formed on an electrically insulating material 302, which is inert with respect to the slurry and may be for example a phenolic plastic sheet. Because the carrier back side must be perfectly flat so that it can move unobstructed over rollers 200 during loading, conductive strips 300 are preferably flat and embedded flush with the surface of back plate 106'. Embedding conductive strips 300 also avoids making changes to other parts of the polishing system. Because the carrier has not changed in height, the gripper arms can remain unmodified.

Figure 3C:
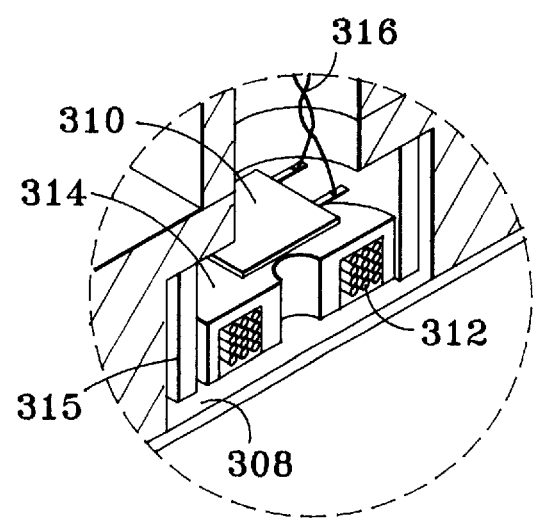

Sensor 306 is embedded in front plate 104' so that sensor 306 will be proximate the back side of one of the wafers 202 in one of the wafer template recesses 102 during polishing. FIG. 3c shows an enlarged view of sensor 306 from FIG. 3a. Sensor 306 is coupled to conductive strips 300 by signal leads 316, inserted in a recess in the front side of the front plate, and held securely by an epoxy fill 308. The surface of the dried epoxy is flush with the surface of front plate 104', achieved for example by sanding and polishing. During chemical-mechanical polishing, sensor 306 is protected from chemical attack by the slurry by both epoxy fill 308 and by wafer template 101.

In the preferred embodiment, sensor 306 encloses a circuit made of a capacitor 310 and an inductor 312. Inductor coil 312 is enclosed on three sides (all except the side proximate the wafer) by a ferrite housing 314 in order to shield the electromagnetic field created from the metal of carrier 100'. Sensor 306 may further be enclosed in a phenolic tube 315 to provide mechanical strength. Generally, the electromagnetic field passes through a conductive film on the wafer. As the film is polished away, the sensor is used to monitor the change in the film thickness, and can very accurately determine when the polishing endpoint has been reached. Multiple sensors can be used, however each sensor would need a separate pair of conductive strips, contact, and wiring. Details of how the sensor circuit operates are described in copending application Ser. No. 08/419,206. Note however that other sensor types may be substituted, but are not preferred.

Figure 4:
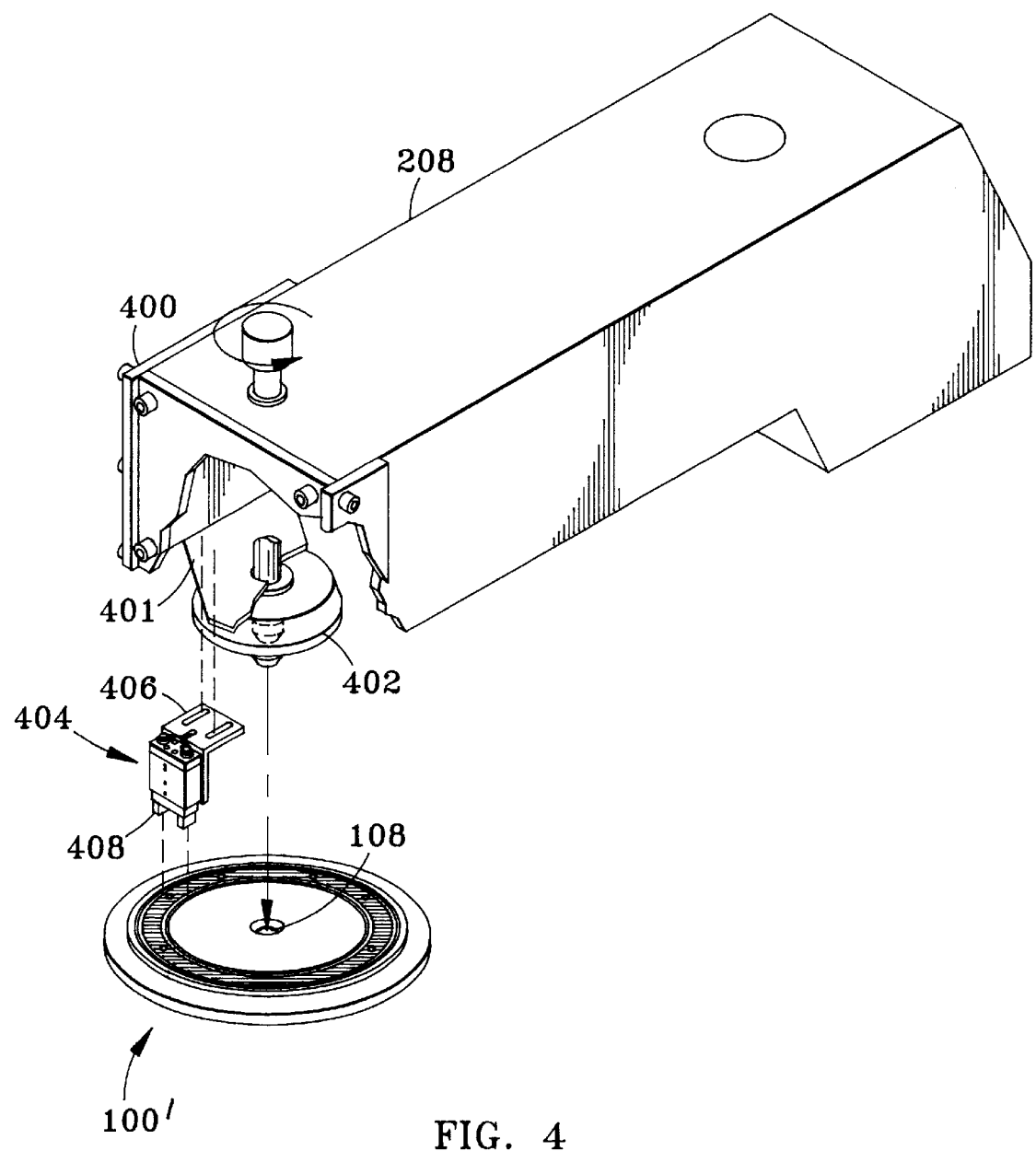
FIG. 4 shows the modified drive arm.

FIG. 4 shows how carrier 100' is coupled (both mechanically and electrically) to drive arm 208. Mechanically, drive wheel 402 aligns with recess 108 and couples by vacuum to the top surface of carrier 100'. For electrical coupling, drive arm 208 has been modified as shown by the addition of an adapter plate 400 (shown in partial cutaway) and a contact assembly 404. Adapter plate 400 is attached on the end of drive arm 208 as shown, and has a horizontal portion 401 with a cutout for drive wheel 402. Contact assembly 404 is fixed to adapter plate 400 with screws (or other fastening means) through an angled bracket 406. Contact assembly 404 has brush contacts 408, separated by the same distance as conductive strips 300, which provide rotary signal coupling to conductive strips 300 on carrier 100'. Adapter plate 400 allows adjustment of the height and radius of contact assembly 404 above carrier 100' and ensures that contact assembly 404 is concentric with the axis of rotation for carrier 100' by means of the cutout for drive wheel 402.

Figure 5:
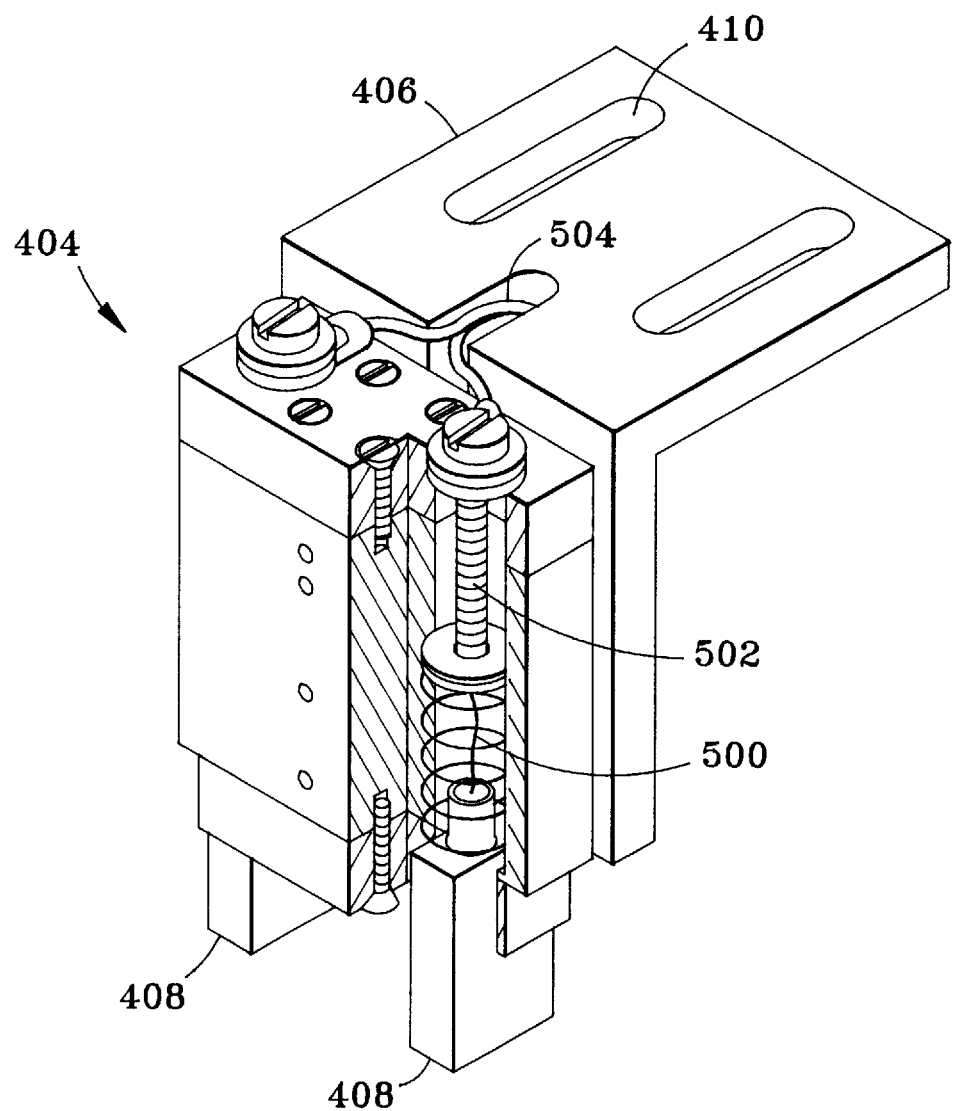
FIG. 5 shows the contact assembly; all in accordance with the present invention.

FIG. 5 shows contact assembly 404, partially cut away. Contact assembly 404 is adjusted horizontally on bracket 406 using slots 410, and vertically with another pair of slots (not shown) on bracket 406. Brush contacts 408 are preferably made of any conductive material with a low coefficient of friction which is not easily oxidized such as graphite and are housed by a material which is impervious to the slurry such as plexiglas. Contacts 408 are spring-loaded to maintain continuous electrical contact (with a large contact area to lower electrical noise) to conductive strips 300 while carrier 100' rotates. Flexible wires 500 connect contacts 408 to screws 502, and assembly 404 is then coupled to a measurement instrument (not shown) by leads 504 which can be attached internally or externally to drive arm 208.

This design was easily retrofitted to an existing Strasbaugh polishing tool. Sensor 306 was added to standard front plate 104; an insulating material 302 with conductive strips 300 was added to the back side of back plate 106, and adapter plate 400 with contact assembly 404 was added to drive arm 208. No significant changes were required for drive arm 208, and wafer template 101 was unmodified. The same total height was maintained for the modified wafer carrier 100' so that no loading apparatus (e.g. gripper arms 204, 206 and rollers 200) or polishing table adjustments were necessary.

In summary, a rotary means of signal coupling has been provided for real time in-situ monitoring of a chemical mechanical planarization process, particularly with a Strasbaugh polisher. The signal coupling described is largely inert to the chemically corrosive slurry. The signal is also shielded from the effects of noise created by the rotating carrier. The signal coupling provided requires minimal modifications to an existing Strasbaugh polisher, and thus is extremely cost effective and easy to manufacture.

While the invention has been described in terms of specific embodiments, it is evident in view of the foregoing description that numerous alternatives, modifications and variations will be apparent to those skilled in the art. Thus, the invention is intended to encompass all such alternatives, modifications and variations which fall within the scope and spirit of the invention and the appended claims.

What is claimed is:

1. An apparatus for rotary signal coupling in in-situ monitoring of a chemical-mechanical polishing process by a polisher, comprising:

a sensor fixed to a rotatable wafer carrier for creating a signal responsive to the chemical mechanical polishing process;

at least one conductor coupled to the sensor for receiving the signal, the conductor fixed to the rotatable wafer carrier;

a contact coupled to the conductor, the contact fixed to a stationary drive arm; and signal transfer means coupled to the contact for transferring the signal to a monitoring means.

2. The apparatus of claim 1 wherein the sensor comprises a capacitor and an inductor both enclosed by a ferrite housing.

3. The apparatus of claim 1 wherein the conductor comprises a shape configured for continuous coupling to the contact during rotation of the wafer carrier.

4. The apparatus of claim 3 wherein the conductor is made of a material which is inert to slurry used in chemical-mechanical polishing.

5. The apparatus of claim 4 wherein the conductor is made of stainless steel.

6. The apparatus of claim 1 wherein the contact comprises a brush contact.

7. The apparatus of claim 6 wherein the brush contact is spring-loaded.

8. The apparatus of claim 6 wherein the brush contact is made from graphite.

9. The apparatus of claim 1 wherein the wafer carrier comprises:

a back plate having a back side and a front side;

a front plate having a back side fixed to the front side of the back plate and a front side; and a wafer template having a back side fixed to the front side of the front plate and a front side with at least one recess for holding a semiconductor wafer.

10. The apparatus of claim 9 wherein the sensor is embedded in the front plate so that the sensor is proximate the back side of the wafer template and also proximate the recess for holding a semiconductor wafer.

11. The apparatus of claim 9 wherein the conductor is at least one ring fixed to the back side of the back plate and embedded in the back plate so that the conductor is flush with the back side of the back plate.

12. The apparatus of claim 11 wherein the conductor is isolated from the wafer carrier by an insulating material.

13. The apparatus of claim 11 wherein the conductor is two concentric rings.

14. A method for in-situ monitoring of chemical-mechanical polishing a semiconductor wafer fixed to a rotating wafer carrier, comprising:

creating a signal responsive to chemical mechanical polishing the wafer;

sensing the signal with a sensor fixed to the rotating wafer carrier;

coupling the signal from the sensor to a conductor fixed to the rotating wafer carrier;

coupling the signal from the conductor to a contact fixed to a stationary drive arm; and transferring the signal from the contact to a monitoring means.

* * * * *